(12) United States Patent
Takeuchi et al.

(10) Patent No.: US 9,614,218 B2
(45) Date of Patent: Apr. 4, 2017

(54) COMPOSITE CARBON PARTICLE AND LITHIUM-ION SECONDARY CELL USING SAME

(71) Applicant: SHOWA DENKO K.K., Tokyo (JP)

(72) Inventors: Masataka Takeuchi, Tokyo (JP);
Yoshihito Yokoyama, Tokyo (JP);
Chiaki Sotowa, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/435,245

(22) PCT Filed: Oct. 11, 2013

(86) PCT No.: PCT/JP2013/006100
§ 371 (c)(1),
(2) Date: Apr. 13, 2015

(87) PCT Pub. No.: WO2014/057690
PCT Pub. Date: Apr. 17, 2014

(65) Prior Publication Data
US 2015/0270535 A1    Sep. 24, 2015

(30) Foreign Application Priority Data

Oct. 12, 2012 (JP) .................. 2012-226811

(51) Int. Cl.
| | | |
|---|---|---|
| *H01M 4/36* | (2006.01) | |
| *H01M 4/587* | (2010.01) | |
| *H01M 10/0525* | (2010.01) | |
| *H01M 10/0565* | (2010.01) | |
| *H01M 10/0569* | (2010.01) | |
| *H01M 4/04* | (2006.01) | |
| *H01M 4/133* | (2010.01) | |
| *H01M 4/1393* | (2010.01) | |
| *H01M 4/02* | (2006.01) | |

(52) U.S. Cl.
CPC ......... *H01M 4/366* (2013.01); *H01M 4/0402* (2013.01); *H01M 4/0471* (2013.01); *H01M 4/133* (2013.01); *H01M 4/1393* (2013.01); *H01M 4/587* (2013.01); *H01M 10/0525* (2013.01); *H01M 10/0565* (2013.01); *H01M 10/0569* (2013.01); *H01M 2004/027* (2013.01); *H01M 2300/0028* (2013.01); *H01M 2300/0082* (2013.01); *Y02P 70/54* (2015.11); *Y02T 10/7011* (2013.01)

(58) Field of Classification Search
None
See application file for complete search history.

(56) References Cited

U.S. PATENT DOCUMENTS

| | | | |
|---|---|---|---|
| 2007/0092429 A1 | 4/2007 | Mao et al. | |
| 2008/0090148 A1 | 4/2008 | Mao et al. | |
| 2010/0178563 A1* | 7/2010 | Ozaki | H01M 4/587 429/231.8 |
| 2012/0045642 A1* | 2/2012 | Nishimura | C01B 31/04 428/367 |
| 2014/0057166 A1 | 2/2014 | Yokoyama et al. | |

FOREIGN PATENT DOCUMENTS

| | | |
|---|---|---|
| JP | 2976299 B2 | 11/1999 |
| JP | 3193342 B2 | 7/2001 |
| JP | 2004-210634 A | 7/2004 |
| JP | 2005-285633 A | 10/2005 |
| JP | 2008-300274 A | 12/2008 |
| WO | 2013/084506 A1 | 6/2013 |

OTHER PUBLICATIONS

International Search Report for PCT/JP2013/006100 dated Jan. 7, 2014.
Supplementary European Search Report dated Feb. 25, 2016, issued by the European Patent Office in corresponding application No. 13 84 4916.

* cited by examiner

*Primary Examiner* — Patrick Ryan
*Assistant Examiner* — Wyatt McConnell
(74) *Attorney, Agent, or Firm* — Sughrue Mion, PLLC

(57) ABSTRACT

A composite carbon particle for use in a negative electrode of a lithium-ion secondary battery, the composite carbon particle including a core particle composed of a carbon material obtained by heating, at not higher than 2500° C., petroleum coke having a Hardgrove grindability index (HGI value) of 30 to 60 (defined by ASTM D409), and a covering layer composed of a carbonaceous material obtained by heating an organic compound at 1000° C. to 2000° C. The composite carbon particle has a 50% particle diameter (D50) of 1 μm to 30 μm in a volume-based cumulative particle size distribution as measured by a laser diffraction method.

20 Claims, No Drawings

COMPOSITE CARBON PARTICLE AND LITHIUM-ION SECONDARY CELL USING SAME

CROSS REFERENCE TO RELATED APPLICATIONS

This application is a National Stage of International Application No. PCT/JP2013/006100 filed Oct. 11, 2013, claiming priority based on Japanese Patent Application No. 2012-226811 filed Oct. 12, 2012, the contents of all of which are incorporated herein by reference in their entirety.

TECHNICAL FIELD

The present invention relates to a composite carbon particle and a use of the same. More specifically, the present invention relates to a composite carbon particle that is useful as a negative electrode active material for providing a lithium-ion secondary battery having low internal resistance and excellent cycle characteristics in rapid charging/discharging by high-current, a method for producing the same, and a lithium-ion secondary battery comprising the composite carbon particle.

BACKGROUND ART

Lithium-ion secondary batteries serve as a power source in portable electronic devices and the like. With the trend of portable electronic devices toward functional diversification and increased power consumption, further enhancement of the capacity of lithium-ion secondary batteries is required. Lithium-ion secondary batteries also serve as power sources in electric tools, electric vehicles, and the like. A lithium-ion secondary battery in an electric vehicle such as battery electric vehicles (BEVs) and hybrid electric vehicles (HEVs) is required to retain excellent charging/discharging cycle characteristics for 10 years or longer, to have a large current load characteristic for driving the high-power motor, and to have high energy density per unit volume so as to enhance the cruising distance.

Carbon materials are classified into carbon materials with a low degree of crystallinity (hereinafter, called amorphous carbon materials) and carbon materials with a high degree of crystallinity (hereinafter, called highly crystalline carbon materials). Either carbon material allows intercalation and deintercalation of lithium and therefore is usable as a negative electrode active material.

Generally, a lithium-ion secondary battery that comprises an amorphous carbon material as a negative electrode active material is known to have high battery capacity and be adaptable to rapid charging/discharging. A lithium-ion secondary battery that comprises an amorphous carbon material, however, is also known that the capacity significantly decreases due to repeated charging/discharging cycles (cycle capacity loss).

On the other hand, a lithium-ion secondary battery that comprises a highly crystalline carbon material as a negative electrode active material is known to have stable cycle characteristics and have lower internal resistance than that of a lithium-ion secondary battery comprising an amorphous carbon material. A lithium-ion secondary battery that comprises a highly crystalline carbon material, however, is not capable of being rapidly charged/discharged. This is because intercalation/deintercalation of lithium ions on the side of the negative electrode active material does not proceed fast enough for rapid charging/discharging and therefore the voltage of the battery rapidly reaches its lower limit or upper limit from which the reaction does not proceed any further.

Various composite materials comprising an amorphous carbon material and a highly crystalline carbon material have been proposed.

For example, Patent Document 1 discloses a negative electrode active material that is produced by heating a mixture of a natural graphite particle and pitch in an inert gas atmosphere at 900 to 1100° C. so as to coat the surface of the natural graphite particle with amorphous carbon.

Patent Document 2 discloses a two-layer carbon material obtained by immersing a highly crystalline carbon material that is to be used as the core in tar or pitch and then drying the resultant or heating the resultant at 900 to 1300° C.

Patent Document 3 discloses a carbon material that is obtained by mixing a graphite particle resulting from granulation of natural graphite or scaly artificial graphite with a carbon precursor such as pitch and then calcining the resulting mixture in an inert gas atmosphere at a temperature ranging from 700 to 2800° C.

Patent Document 4 discloses a composite graphite particle that is obtained by granulating scaly graphite having a $d_{002}$ of 0.3356 nm, an R value of about 0.07, and an Lc of about 50 nm with mechanical external force applied thereto and then coating the resulting spherical graphite particle with a carbonized material obtained by heating a phenolic resin.

Patent Document 1: JP 2005-285633 A
Patent Document 2: JP 2976299 B
Patent Document 3: JP 3193342 B
Patent Document 4: JP 2004-210634 A

SUMMARY OF THE INVENTION

Problems to be Solved by the Invention

The lithium-ion secondary batteries comprising the carbon materials described in Patent Documents 1 to 4 have high resistance value of the battery, low initial efficiency, and insufficient cycle characteristics in rapid charging/discharging by high-current.

Therefore, an object of the present invention is to provide a composite carbon particle that is useful as a negative electrode active material for fabricating a lithium-ion secondary battery having low resistance value of the battery, high initial efficiency, and excellent cycle characteristics in rapid charging/discharging by high-current, a method for producing the same, and a lithium-ion secondary battery comprising the composite carbon particle.

Means for Solving the Problems

The inventors of the present invention conducted research to achieve the object and, as a result, finally completed the present invention that includes the following embodiments.

The present invention includes the following embodiments.

[1] A composite carbon particle for use in a negative electrode of a lithium-ion secondary battery, the composite carbon particle comprising:

a core particle composed of a carbon material obtained by heating, at not higher than 2500° C., petroleum coke having a Hardgrove grindability index (HGI value) of 30 to 60 (defined by ASTM D409), and a covering layer composed of a carbonaceous material obtained by heating an organic compound at 1000° C. to 2000° C., wherein the composite carbon particle has a 50% particle diameter (D50) of 1 μm to 30 μm in a volume-based cumulative particle size distribution as measured by laser diffraction method.

[2] The composite carbon particle according to [1], of which the specific surface area is 0.4 m²/g to 50 m²/g.

[3] The composite carbon particle according to [1] or [2], wherein the organic compound is at least one selected from the group consisting of petroleum pitch, coal tar pitch, phenolic resins, polyvinyl alcohol resins, furan resins, cellulose resins, polystyrene resins, polyimide resins, and epoxy resins.

[4] The composite carbon particle according to any one of [1] to [3], wherein the amount of the covering layer is 0.05 to 10% by mass relative to the amount of the core particle.

[5] A method for producing a composite carbon particle for use in a negative electrode of a lithium-ion secondary battery, the producing method comprising:

heating, at not higher than 2500° C., petroleum coke having a Hardgrove grindability index (HGI value) of 30 to 60 (defined by ASTM D409) to obtain a core particle composed of a carbon material, coating the core particle with an organic compound and heating the resultant at a temperature of 1000° C. to 2000° C., and grinding and/or classifying the resultant so that the 50% particle diameter (D50) in a volume-based cumulative particle size distribution as measured by laser diffraction method is 1 μm to 30 μm.

[6] A negative electrode paste comprising the composite carbon particle as described in any one of [1] to [4], a binder, and a solvent.

[7] A negative electrode sheet comprising a current collector, and an electrode layer comprising the composite carbon particle as described in any one of [1] to [4] and a binder, in which the electrode layer is laid on the current collector.

[8] A lithium-ion secondary battery comprising the negative electrode sheet as described in [7] and a positive electrode sheet.

[9] The lithium-ion secondary battery according to [8], further comprising a non-aqueous electrolytic solution and/or a non-aqueous polymer electrolyte, wherein the non-aqueous electrolytic solution and/or the non-aqueous polymer electrolyte comprises at least one selected from the group consisting of ethylene carbonate, diethyl carbonate, dimethyl carbonate, methylethyl carbonate, butylene carbonate, and vinylene carbonate.

Advantageous Effects of the Invention

The composite carbon particle according to the present invention is useful as a negative electrode active material for providing a lithium-ion secondary battery that has low resistance value of the battery, high initial efficiency, and excellent cycle characteristics in rapid charging/discharging by high-current. The lithium-ion secondary battery of the present invention has low resistance value of the battery, high initial efficiency, and excellent cycle characteristics in rapid charging/discharging by high-current, and therefore can be used as a power source in electronic apparatus such as mobile phones, laptop or tablet personal computers, digital cameras and the like and high-power instruments such as electric tools, electric bicycles and the like.

EMBODIMENTS FOR CARRYING OUT THE INVENTION

The present invention will be described in more detail.
(Composite Carbon Particle)

The composite carbon particle according to an embodiment of the present invention comprises a core particle composed of a carbon material and a covering layer composed of a carbonaceous material.

The carbon material to constitute the core particle is obtained by heating petroleum coke. The petroleum coke has the Hardgrove grindability index (HGI value) of usually 30 to 60, and preferably 35 to 55.

The Hardgrove grindability index can be determined by measurement based on ASTM D409. First, 50 g of coke that has been prepared to have particle sizes ranging from 1.18 to 600 μm is loaded into a Hardgrove grindability tester. After 60 revolutions at 5 to 20 rpm, the operation of the tester is stopped. The resulting coke is sieved through a 75-μm sieve for 10 minutes, 5 minutes, and then 5 minutes, 20 minutes in total. The weight, W, of the passing sieve is measured. The Hardgrove grindability index is determined by calculation by formula:

HGI=13+6.93 W.

Heating of the petroleum coke is performed at a temperature not higher than 2500° C., preferably not lower than 1000° C. and not higher than 2000° C., and more preferably not lower than 1100° C. and not higher than 1500° C. Heating is preferably performed in an inert atmosphere. Heating may be performed in an Acheson carbonization furnace.

The specific surface area of the carbon material to constitute the core particle is preferably 1 to 10 m²/g, and more preferably 1 to 7 m²/g. The specific surface area within this range tends to lead to providing the lithium-ion secondary battery having large battery capacity. The specific surface area is determined by calculation by the BET method based on nitrogen adsorption.

Heating the coke can be, where appropriate, followed by disintegration and/or classification to give a core particle having a desired particle size. The core particle has the 50% particle diameter in a volume-based cumulative particle size distribution measured by laser diffraction method of preferably 1 to 30 μm, more preferably 3 to 25 μm, and further preferably 5 to 20 μm.

When the amount of fine particles is large, it can be difficult to raise the electrode density. When the amount of larger particles is large, coating speckles occur during application of an electrode slurry and battery properties can be significantly impaired. Therefore, the particle size distribution of the core particle is preferably such that 90% or more of the particles based on number has particle diameters within the range of 3 to 18 μm.

The carbonaceous material constituting the covering layer is obtained by heating an organic compound.

The organic compound is not particularly limited as long as it can give a carbonaceous material. The organic compound is preferably at least one selected from the group consisting of petroleum pitch, coal tar pitch, phenolic resins, polyvinyl alcohol resins, furan resins, cellulose resins, polystyrene resins, polyimide resins, and epoxy resins.

The covering layer is formed preferably by coating the core particle with the organic compound and heating the resultant. Examples of the technique to coat the core particle with the organic compound include a method in which the core particle is dry mixed with the organic compound and a method in which the organic compound in a dissolved or melt state is wet mixed with the core particle. Examples of the technique of mixing include a method of stirring the core particles while the organic compound is sprayed to the core particle. Alternatively, an instrument such as a hybridizer manufactured by Nara Machinery Co., Ltd. can be used to mix the core particle and the organic compound so as to allow the mechanochemical treatment to proceed.

The heating is performed usually at not lower than 1000° C. and not higher than 2000° C., preferably at not lower than 1000° C. and not higher than 1800° C., and more preferably at not lower than 1050° C. and not higher than 1650° C. When the temperature at the time of heating is too low, carbonization tends not to proceed adequately and remaining hydrogen atom and/or oxygen atom can affect battery properties. On the other hand, when the temperature at the time of heating is too high, the resulting coat tends to fall off, and/or tends to be excessively crystalline, leading to impaired charge/discharge characteristics. Heating is preferably performed in a non-oxidizing atmosphere. Examples of the non-oxidizing atmosphere include an atmosphere filled with an inert gas such as argon gas, nitrogen gas or the like.

The carbonaceous material to constitute the covering layer has the R value of preferably not lower than 0.2. The R value refers to the intensity ratio, $I_D/I_G$, of the intensity ($I_D$) of the peak in 1300 to 1400 $cm^{-1}$ to the intensity ($I_G$) of the peak in 1580 to 1620 $cm^{-1}$, measured by Raman spectroscopy. When a carbonaceous layer is high in the R value, in other words, a layer of an amorphous carbon material is placed on the surface of the core particle, intercalation and deintercalation of lithium ions are facilitated and the resulting lithium-ion secondary battery is improved in its rapid charge/discharge characteristics.

The R value was determined as follows. A Laser Raman Spectrophotometer (NRS-3100) manufactured by JASCO Corporation was used to carry out measurement under conditions where an excitation wavelength of 532 nm, an entrance slit width of 200 μm, an exposure time of 15 seconds, 2 times of integration, and a diffraction grating with 600 lines/mm. The ratio ($I_D/I_G$) of the intensity, $I_D$, of the peak in the vicinity of 1360 $cm^{-1}$ (from amorphous component) to the intensity, $I_G$, of the peak in the vicinity of 1580 $cm^{-1}$ (from graphite component) was computed from the measured spectrum. This was taken as an R value to give a measure of the degree of graphitization.

Heating is preferably followed by grinding and/or classifying. Since such heating can allow composite carbon particles to fuse with each other into lumps, it is preferable to perform grinding and/or classifying after the heating and use the resultant as an electrode active material.

The 50% particle diameter (D50) in a volume-based cumulative particle size distribution measured by laser diffraction method of the composite carbon particle according to an embodiment of the present invention is 1 to 30 μm, preferably 3 to 25 μm, and more preferably 5 to 20 μm.

The particle size distribution of the composite carbon particle according to an embodiment of the present invention is preferably such that 90% or more of the particles based on number has particle diameters within the range of 3 to 18 μm.

The specific surface area of the composite carbon particle is 0.5 to 30 $m^2/g$, preferably 0.5 to 10 $m^2/g$, and more preferably 0.5 to 5 $m^2/g$. The specific surface area is determined by calculation by the BET method based on nitrogen adsorption.

The amount of the covering layer to constitute the composite carbon particle of the present invention is not particularly limited. The amount of the covering layer is preferably 0.05 to 10 parts by mass and more preferably 0.1 to 10 parts by mass relative to 100 parts by mass of the core particle. When the amount of the covering layer is too large, the capacity tends to decrease. In the composite carbon particle of the present invention, the covering layer may be only on the surface of the core particle. The amount of the covering layer herein refers to the amount of the organic compound for producing the composite carbon particle of the present invention. The thickness of the covering layer in the composite carbon particle is preferably several tens of nanometers and more preferably not smaller than 10 nm and smaller than 100 nm.

A preferable composite carbon particle according to the present invention has the $I_{110}/I_{004}$ of preferably not lower than 0.2, more preferably not lower than 0.3, and further preferably not lower than 0.5, where the $I_{110}/I_{004}$ is the ratio of the peak intensity ($I_{110}$) of the 110 diffraction peak to the peak intensity ($I_{004}$) of the 004 diffraction peak obtained from X-ray diffraction of a small piece having an electrode density of 1.55 to 1.65 $g/cm^3$. The small piece is formed by pressuring the composite carbon particle using a binder. When the ratio $I_{110}/I_{004}$ is higher, the crystal orientation inside the electrode is lower.

The $d_{002}$ of a preferable composite carbon particle according to the present invention is not larger than 0.337 nm. The Lc of a preferable composite carbon particle of the present invention is not smaller than 100 nm. The $d_{002}$ refers to the value of interplanar spacing determined from a 002 diffraction peak measured by X-ray powder diffraction, while the $L_C$ refers to the size of a crystallite in the c axis direction determined from a 002 diffraction peak measured by X-ray powder diffraction.

(Negative Electrode Paste)

The negative electrode paste in an embodiment of the present invention comprises the composite carbon particle, a binder, a solvent, a conductive additive if necessary, and the like. The negative electrode paste can be obtained, for example, by kneading the composite carbon particle with a binder, a solvent, a conductive additive if necessary, and the like. The negative electrode paste can be formed into a sheet or a pellet, for example.

Examples of the binder include polyethylene, polypropylene, ethylene-propylene terpolymers, butadiene rubber, styrene-butadiene rubber, butyl rubber, acrylic rubber, polymer compounds with high ionic conductivity and the like. Examples of the polymer compounds with high ionic conductivity include polyvinylidene fluoride, polyethylene oxide, polyepichlorohydrin, polyphosphazenes, polyacrylonitrile and the like. The amount of the binder is preferably 0.5 to 20 parts by mass relative to 100 parts by mass of the composite carbon particle.

The conductive additive is not particularly limited provided that it imparts conductivity and consistent electrode performance (capacity to buffer changes in volume caused by intercalation and deintercalation of lithium ions) to an electrode. Examples thereof include vapor grown carbon fiber ("VGCF" manufactured by Showa Denko K.K., for example), conductive carbon ("DENKA BLACK" manufactured by DENKI KAGAKU KOGYO KABUSHIKI KAISHA, "Super C65" manufactured by TIMCAL GRAPHITE & CARBON, "Super C45" manufactured by TIMCAL GRAPHITE & CARBON, and "KS6L" manufactured by TIMCAL GRAPHITE & CARBON, for example) and the like. The amount of the conductive additive is preferably 10 to 100 parts by mass relative to 100 parts by mass of the composite carbon particle.

The solvent is not particularly limited. Examples of the solvent include N-methyl-2-pyrrolidone, dimethylformamide, isopropanol, water and the like. In the case of using a binder that uses water as a solvent, combined use of a thickener is preferable. The amount of the solvent is determined such that the resulting paste has viscosity that allows easy application to a current collector.

(Negative Electrode Sheet)

The negative electrode sheet of an embodiment of the present invention includes a current collector and an electrode layer to coat the current collector.

Examples of the current collector include nickel foil, copper foil, a nickel mesh, and a copper mesh.

The electrode layer comprises a binder and the composite carbon particle. The electrode layer can be obtained, for example, by applying and then drying the negative electrode paste. The method of applying the paste is not particularly limited. The thickness of the electrode layer is usually 50 to 200 µm. When the electrode layer is too thick, the negative electrode sheet may not be accommodated in a standardized cell casing. The thickness of the electrode layer can be controlled by the amount of the paste applied or by subjecting the paste to pressure forming after drying. Examples of the method of pressure forming include roll pressing, plate pressing and the like. The pressure at the time of pressure forming is preferably from about 100 MPa to about 300 MPa (about 1 to 3 tons/cm$^2$).

(Lithium-Ion Secondary Battery)

The lithium-ion secondary battery of an embodiment of the present invention comprises the negative electrode sheet according to the present invention, a positive electrode sheet, and a non-aqueous electrolyte solution and/or a non-aqueous polymer electrolyte as the constituents.

The positive electrode sheet can be a sheet conventionally used in a lithium-ion secondary battery, specifically one comprising a positive electrode active material. Examples of the positive electrode active material include $LiNiO_2$, $LiCoO_2$, $LiMn_2O_4$, $LiNi_{0.34}Mn_{0.33}Co_{0.33}O_2$, $LiFePO_4$ and the like The non-aqueous electrolyte solution and the non-aqueous polymer electrolyte for use in the lithium-ion secondary battery are not particularly limited. Examples thereof include an organic electrolyte solution produced by dissolving a lithium salt such as $LiClO_4$, $LiPF_6$, $LiAsF_6$, $LiBF_4$, $LiSO_3CF_3$, $CH_3SO_3Li$, $CF_3SC_3Li$ or the like in a non-aqueous solvent such as ethylene carbonate, diethyl carbonate, dimethyl carbonate, ethyl methyl carbonate, propylene carbonate, butylene carbonate, acetonitrile, propionitrile, dimethoxyethane, tetrahydrofuran, and γ-butyrolactone; a polymer electrolyte gel comprising polyethylene oxide, polyacrylonitrile, polyvinylidene fluoride, polymethyl methacrylate or the like; and a solid polymer electrolyte comprising, for example, a polymer having an ethylene oxide bond.

To the electrolyte solution, a substance that undergoes decomposition during the first charging of the lithium-ion secondary battery may be added at a small amount. Examples of the substance include vinylene carbonate, biphenyl, propane sultone and the like. The amount thereof is preferably 0.01 to 5% by mass.

The lithium-ion secondary battery of the present invention can comprise a separator between the positive electrode sheet and the negative electrode sheet. Examples of the separator include a nonwoven fabric, cloth, a microporous film, or a combination of these, predominantly composed of polyolefin such as polyethylene, polypropylene or the like.

EXAMPLES

The present invention will be described more specifically by examples. These examples are merely for the purpose of explanation, and the scope of the present invention is not limited to these examples.

Various properties were measured as follows.

(Specific Surface Area)

Measurement was performed by the BET method based on nitrogen adsorption.

(Particle Diameter)

To 50 ml of water, 2 microspatulafuls of a powder and 2 drops of a nonionic surfactant (Triton-X; manufactured by Roche Applied Science) were added, followed by ultrasonic dispersion for 3 minutes. The resulting dispersion was loaded into a laser diffraction particle size analyzer (LMS-2000e) manufactured by Seishin Enterprise Co., Ltd. for measurement of the volume-based particle size distribution, followed by calculation to give the 50% particle diameter (D50).

(Hardgrove Grindability Index (HGI Value))

Coke was prepared to have particle sizes ranging from 1.18 to 600 µm, and 50 g of the resulting coke was loaded into a Hardgrove grindability tester. After 60 revolutions at 5 to 20 rpm, the operation of the tester was stopped. The sample thus processed was sieved through a 75-µm sieve for 10 minutes, 5 minutes, and then 5 minutes, 20 minutes in total. The weight, W, of the passing sieve was measured. The Hardgrove grindability index was determined by calculation by formula:

$$HGI=13+6.93\ W.$$

(Initial Efficiency Measurement)

The following process was performed inside a glove box in a dry argon gas atmosphere at a dew point not higher than −75° C.

A 2032 type coin cell (20 mm in diameter, 3.2 mm in thickness, manufactured by Hohsen Corp.) was prepared. A negative electrode sheet having a diameter of 15 mm was placed in a coin cell casing. Thereinto an electrolyte solution was poured so that the negative electrode sheet was impregnated therewith. A separator (Celgard 2400) with a diameter of 20 mm and lithium foil with a diameter of 17.5 mm and a thickness of 3 mm were placed thereon in this order. A coin cell cap having a gasket thereon was placed on top, and then the coin cell casing and the coin cell cap were hermetically crimped together to give a lithium-ion secondary battery (coin cell) for evaluation use.

The electrolyte solution used was prepared by dissolving electrolyte $LiPF_6$ at a concentration of 1 mol/L in a mixed solvent composed of 1:1:3 by volume of propylene carbonate, ethylene carbonate, and ethyl methyl carbonate.

The resulting coin cell was taken out of the glove box and was left for 24 hours at room temperature.

The coin cell was charged from rest potential to 5 mV versus lithium metal foil at a constant current at 0.2 C. Charging was continued at a constant voltage of 5 mV until 20 hours elapsed since the start of constant-current charging. This was followed by discharging at a constant current of 0.2 C to the cut-off voltage of 1.5 V, and then charging/discharging was stopped for 10 minutes. The charge capacity and the discharge capacity at that time were measured to determine the initial efficiency by calculation by the formula below. The calculation was based on the C-rate of the coin cell as 300 mAh per 1 g of the negative electrode active material.

(Initial Efficiency)=(discharge capacity)/(charge capacity)

(Measurement of Cycle Characteristics)

The following process was allowed to proceed inside a glove box in a dry argon gas atmosphere at a dew point not higher than −80° C.

A mixture of 90 parts by mass of $LiMO_2$ (M=Ni, Mn, Co; ternary positive electrode material manufactured by Unicore), 2 parts by mass of a conductive additive (C45; manufactured by TIMCAL GRAPHITE & CARBON), 3 parts by mass of a conductive additive (KS6L), and 5 parts by mass (as solid content) of polyvinylidene fluoride (KF polymer W#1300; manufactured by Kureha Corporation) was stirred with N-methyl-pyrrolidone being added thereto as needed so as to give a slurry.

The resulting slurry was applied onto aluminum foil of 20-μm thick with a doctor blade having a clearance of 200 μm, followed by drying and pressure forming. From the resultant, a 2-cm by 2-cm piece was cut out to serve as a positive electrode sheet.

The negative electrode sheet and the positive electrode sheet were stacked with a polypropylene separator (Celgard 2400; manufactured by Tonen) sandwiched therebetween. The resultant was placed in an aluminum laminate bag, into which an electrolyte solution was injected, followed by vacuum heat sealing to give a laminated cell for evaluation use.

The electrolyte solution used was prepared by dissolving electrolyte $LiPF_6$ at a concentration of 1 mol/L in a mixed solvent composed of 1:1:3 by volume of propylene carbonate, ethylene carbonate, and ethyl methyl carbonate.

The laminated cell was subjected to charging and discharging under the following conditions. The calculation of the C-rate of the laminated cell was based on the positive electrode active material, and the calculation of the capacity per weight was based on 150 mAh per 1 g of the ternary positive electrode material. As the capacity per weight of the negative electrode in the laminated cell, the corresponding value determined for the coin cell was used. The ratio (negative electrode capacity)/(positive electrode capacity) of the laminated cell was adjusted to 1.35.

The first and second cycles of charging and discharging were allowed to proceed as follows. The laminated cell was charged at a constant current at 1 C from rest potential to 4.2 V, and then was charged at a constant voltage of 4.2 V. The charging was stopped at the time point when 20 hours passed from the start time of the constant-current charging. This was followed by discharging at a constant current at 1 C to the cut-off voltage of 2.7 V.

The third and subsequent cycles of charging and discharging were allowed to proceed as follows. The laminated cell was charged at a constant current at 2 C from rest potential to 4.2 V, and then was charged at a constant voltage of 4.2 V. The charging was stopped at the time point when the current reached 55 μA. This was followed by discharging at a constant current at 3 C to the cut-off voltage of 2.7 V.

The proportion (capacity retention) of the discharge capacity in the 200th cycle to the discharge capacity in the third cycle was calculated. The capacity retention indicates the cycle characteristics at the time of high-current charging & discharging.

(Measurement of Direct-Current Resistance Characteristics)

A laminated cell was fabricated in the same manner as in the fabrication of the laminated cell for cycle characteristics measurement. The calculation of the C-rate of the cell was based on the positive electrode capacity.

The laminated cell was subjected to charging and discharging under the following conditions and during that time, the current and the voltage values were recorded. The laminated cell was discharged at a constant current at 1 C and was then charged at a constant current at 1 C from rest potential to 4.2 V, and was charged at a constant voltage of 4.2 V. The charging was stopped at the time point when 20 hours passed from the start time of the constant-current charging. This was followed by discharging at a constant current at 0.1 C for 5 hours and then discharging at a constant current at 0.2 C for 5 seconds. The charging/discharging was paused for 30 minutes. The laminated cell was charged at a constant current at 0.02 C to 4.2 V, and was charged at a constant voltage of 4.2 V. The charging was stopped at the time point when 50 seconds passed from the start time of the constant-current charging.

Charging/discharging was performed in the same manner as above except that the 5-second constant-current discharging was carried out at a discharging rate of 0.5 C, 1 C, or 2 C. The current and the voltage values were recorded under each condition of the discharging rates.

All the current and voltage values recorded were used to determine "direct-current resistance characteristics".

Example 1

Production of Composite Carbon Particle

Petroleum coke with an HGI value of 35 was ground to have a 50% particle diameter (D50) of 10 μm. The resultant was calcined at 1300° C. to obtain a core particle. To the core particle, 1% by mass of an isotropic pitch powder was mixed, followed by heating in an argon atmosphere at 1100° C. to obtain a composite carbon particle.

(Preparation of Paste)

Each of 8.00 g of the composite carbon particle, 1.72 g of acetylene black (HS-100, manufactured by DENKI KAGAKU KOGYO KABUSHIKI KAISHA) as a conductive additive, and 4.30 g of polyvinylidene fluoride (KF polymer #9300; manufactured by Kureha Corporation) as a binder was weighed, and these were mixed together well. Thereto, 9.32 g of N-methyl-2-pyrrolidone (manufactured by Kishida Chemical Co., Ltd.) was gradually added, followed by kneading in a defoaming kneader (NBK-1; manufactured by Nihonseiki Kaisha Ltd.) to obtain a paste.

(Preparation of Negative Electrode Sheet)

The paste was applied onto Cu foil of 20-μm thick with a doctor blade having a clearance of 150 μm, and the resultant was placed on a hot plate at about 80° C. to remove the water therefrom. This was followed by drying with a vacuum dryer at 90° C. for 1 hour.

Then, pressure forming was performed with a uniaxial press so that electrode density reached 1.50±0.05 $g/cm^3$ as calculated from the total mass of the composite carbon particle, the conductive additive, and the binder and the volume of the coated layer, whereby a negative electrode sheet was obtained.

From the resulting negative electrode sheet, a piece with a diameter of 15 mm was cut out, which was pressed at 1.2 $t/cm^2$ for 10 seconds. The average thickness of the coated layer was 70 to 80 μm. The loading level of the coated layer was 6.5 to 7.5 $mg/cm^2$.

The resulting negative electrode sheet was subjected to measurement of initial efficiency, cycle characteristics, and direct-current resistance characteristics. The results are shown in Table 1.

Example 2

A composite carbon particle and a negative electrode sheet were obtained in the same manner as in Example 1 except that the temperature at the time of heating in an argon atmosphere was 1600° C. instead of 1100° C. The resulting negative electrode sheet was subjected to measurement of initial efficiency, cycle characteristics, and direct-current resistance characteristics. The results are shown in Table 1.

Example 3

A composite carbon particle and a negative electrode sheet were obtained in the same manner as in Example 1 except that the coke used as raw material was changed to petroleum coke with an HGI value of 50. The resulting negative electrode sheet was subjected to measurement of initial efficiency, cycle characteristics, and direct-current resistance characteristics. The results are shown in Table 1.

Example 4

A composite carbon particle and a negative electrode sheet of the present invention were obtained in the same manner as in Example 3 except that the temperature at the time of heating in an argon atmosphere was 1600° C. instead of 1100° C. The resulting negative electrode sheet was subjected to measurement of initial efficiency, cycle characteristics, and direct-current resistance characteristics. The results are shown in Table 1.

Comparative Example 1

A carbon particle and a negative electrode sheet were obtained in the same manner as in Example 1 except that the isotropic pitch was not mixed. The resulting negative electrode sheet was subjected to measurement of initial efficiency, cycle characteristics, and direct-current resistance characteristics. The results are shown in Table 1.

Comparative Example 2

A carbon particle and a negative electrode sheet were obtained in the same manner as in Example 2 except that the isotropic pitch was not mixed. The resulting negative electrode sheet was subjected to measurement of initial efficiency, cycle characteristics, and direct-current resistance characteristics. The results are shown in Table 1.

Comparative Example 3

A carbon particle and a negative electrode sheet were obtained in the same manner as in Example 3 except that the isotropic pitch was not mixed. The resulting negative electrode sheet was subjected to measurement of initial efficiency, cycle characteristics, and direct-current resistance characteristics. The results are shown in Table 1.

Comparative Example 4

A carbon particle and a negative electrode sheet were obtained in the same manner as in Example 4 except that the isotropic pitch was not mixed. The resulting negative electrode sheet was subjected to measurement of initial efficiency, cycle characteristics, and direct-current resistance characteristics. The results are shown in Table 1.

Comparative Example 5

A composite carbon particle and a negative electrode sheet were obtained in the same manner as in Example 1 except that the coke used as raw material was changed to petroleum coke with an HGI value of 28 and D50 was 12 μm. The resulting negative electrode sheet was subjected to measurement of initial efficiency, cycle characteristics, and direct-current resistance characteristics. The results are shown in Table 1.

Comparative Example 6

A composite carbon particle and a negative electrode sheet were obtained in the same manner as in Example 2 except that the coke used as raw material was changed to petroleum coke with an HGI value of 28 and D50 was 12 μm. The resulting negative electrode sheet was subjected to measurement of initial efficiency, cycle characteristics, and direct-current resistance characteristics. The results are shown in Table 1.

Comparative Example 7

A composite carbon particle and a negative electrode sheet were obtained in the same manner as in Example 1 except that the coke used as raw material was changed to petroleum coke with an HGI value of 70 and D50 was 14 μm. The resulting negative electrode sheet was subjected to measurement of initial efficiency, cycle characteristics, and direct-current resistance characteristics. The results are shown in Table 1.

Comparative Example 8

A composite carbon particle and a negative electrode sheet were obtained in the same manner as in Example 2 except that the coke used as raw material was changed to petroleum coke with an HGI value of 70 and D50 was 14 μm. The resulting negative electrode sheet was subjected to measurement of initial efficiency, cycle characteristics, and direct-current resistance characteristics. The results are shown in Table 1.

TABLE 1

| | HGI | Calcining temp. of coke [° C.] | Isotropic pitch | Heating temp. [° C.] | D50 [μm] | Capacity retention | Direct-current resistance property [Ω] | Initial efficiency [%] |
|---|---|---|---|---|---|---|---|---|
| Ex. 1 | 35 | 1300 | Yes | 1100 | 10 | 0.76 | 4.0 | 88 |
| Ex. 2 | 35 | 1300 | Yes | 1600 | 10 | 0.72 | 4.5 | 84 |
| Ex. 3 | 50 | 1300 | Yes | 1100 | 10 | 0.74 | 3.9 | 86 |
| Ex. 4 | 50 | 1300 | Yes | 1600 | 10 | 0.70 | 4.3 | 82 |
| Comp. Ex. 1 | 35 | 1300 | No | 1100 | 10 | 0.58 | 5.5 | 72 |
| Comp. Ex. 2 | 50 | 1300 | No | 1600 | 10 | 0.55 | 6.0 | 69 |
| Comp. Ex. 3 | 35 | 1300 | No | 1100 | 10 | 0.56 | 5.3 | 70 |
| Comp. Ex. 4 | 50 | 1300 | No | 1600 | 10 | 0.52 | 5.8 | 67 |
| Comp. Ex. 5 | 28 | 1300 | Yes | 1100 | 12 | 0.48 | 6.5 | 74 |
| Comp. Ex. 6 | 28 | 1300 | Yes | 1600 | 12 | 0.49 | 7.0 | 71 |

TABLE 1-continued

|  | HGI | Calcining temp. of coke [° C.] | Isotropic pitch | Heating temp. [° C.] | D50 [μm] | Capacity retention | Direct-current resistance property [Ω] | Initial efficiency [%] |
|---|---|---|---|---|---|---|---|---|
| Comp. Ex. 7 | 70 | 1300 | Yes | 1100 | 14 | 0.62 | 5.8 | 66 |
| Comp. Ex. 8 | 70 | 1300 | Yes | 1600 | 14 | 0.63 | 6.3 | 63 |

The results above prove that a lithium-ion secondary battery that comprises a negative electrode sheet produced with the composite carbon particle according to the present invention (in Examples) has high capacity retention, low direct-current resistance characteristics, and high initial efficiency.

The invention claimed is:

1. A composite carbon particle for use in a negative electrode of a lithium-ion secondary battery, the composite carbon particle comprising:
   a core particle composed of a carbon material obtained by heating, at not higher than 2500° C., petroleum coke having a Hardgrove grindability index (HGI value) of 30 to 60 (defined by ASTM D409), and
   a covering layer composed of a carbonaceous material obtained by heating an organic compound at 1000° C. to 2000° C.,
   wherein the composite carbon particle has a 50% particle diameter (D50) of 1 μm to 30 μm in a volume-based cumulative particle size distribution as measured by laser diffraction method,
   wherein the amount of the covering layer is 0.05 to 1% by mass relative to the amount of the core particle.

2. The composite carbon particle according to claim 1, of which the specific surface area is 0.4 m$^2$/g to 50 m$^2$/g.

3. The composite carbon particle according to claim 1, wherein the organic compound is at least one selected from the group consisting of petroleum pitch, coal tar pitch, phenolic resins, polyvinyl alcohol resins, furan resins, cellulose resins, polystyrene resins, polyimide resins, and epoxy resins.

4. A method for producing a composite carbon particle for use in a negative electrode of a lithium-ion secondary battery, the producing method comprising:
   heating, at not higher than 2500° C., petroleum coke having a Hardgrove grindability index (HGI value) of 30 to 60 (defined by ASTM D409) to obtain a carbon material,
   coating the carbon material with an organic compound and heating the resultant at a temperature of 1000° C. to 2000° C., wherein the amount of the organic compound is 0.05 to 1% by mass relative to the amount of the carbon material, and then
   grinding and/or classifying the resultant so that a 50% particle diameter (D50) in a volume-based cumulative particle size distribution as measured by laser diffraction method is 1 m to 30 μm.

5. A negative electrode paste comprising
   the composite carbon particle as claimed in claim 1,
   a binder, and
   a solvent.

6. A negative electrode sheet comprising
   a current collector, and
   an electrode layer comprising the composite carbon particle as claimed in claim 1 and a binder, in which the electrode layer is laid on the current collector.

7. A lithium-ion secondary battery, comprising;
   the negative electrode sheet as claimed in claim 6, and
   a positive electrode sheet.

8. The lithium-ion secondary battery according to claim 7, further comprising a non-aqueous electrolytic solution and/or a non-aqueous polymer electrolyte, wherein the non-aqueous electrolytic solution and/or the non-aqueous polymer electrolyte comprises at least one selected from the group consisting of ethylene carbonate, diethyl carbonate, dimethyl carbonate, methylethyl carbonate, butylene carbonate, and vinylene carbonate.

9. The composite carbon particle according to claim 2, wherein the organic compound is at least one selected from the group consisting of petroleum pitch, coal tar pitch, phenolic resins, polyvinyl alcohol resins, furan resins, cellulose resins, polystyrene resins, polyimide resins, and epoxy resins.

10. A negative electrode paste comprising
    the composite carbon particle as claimed in claim 2,
    a binder, and
    a solvent.

11. A negative electrode sheet comprising
    a current collector, and
    an electrode layer comprising the composite carbon particle as claimed in claim 2 and a binder, the electrode layer being laid on the current collector.

12. A lithium-ion secondary battery, comprising;
    the negative electrode sheet as claimed in claim 11, and
    a positive electrode sheet.

13. The lithium-ion secondary battery according to claim 12, further comprising a non-aqueous electrolytic solution and/or a non-aqueous polymer electrolyte, wherein the non-aqueous electrolytic solution and/or the non-aqueous polymer electrolyte comprises at least one selected from the group consisting of ethylene carbonate, diethyl carbonate, dimethyl carbonate, methylethyl carbonate, butylene carbonate, and vinylene carbonate.

14. The producing method according to claim 4, wherein the organic compound is at least one selected from the group consisting of petroleum pitch, coal tar pitch, phenolic resins, polyvinyl alcohol resins, furan resins, cellulose resins, polystyrene resins, polyimide resins, and epoxy resins.

15. The composite carbon particle according to claim 1, of which the particle size distribution is such that 90% or more of the particles based on number has particle diameters within the range of 3 to 18 μm.

16. The composite carbon particle according to claim 1, having $d_{002}$ of not larger than 0.337 nm, Lc of not smaller than 100 nm and a specific surface area of 0.5 m$^2$/g to 10 m$^2$/g.

17. The composite carbon particle according to claim 1, having $I_{110}/I_{004}$ of not lower than 0.2, wherein $I_{110}/I_{004}$ is the ratio of a peak intensity ($I_{110}$) of a 110 diffraction peak to a peak intensity ($I_{004}$) of a 004 diffraction peak obtained from X-ray diffraction of a small piece having an electrode density of 1.55 to 1.65 g/cm$^3$, and the small piece is formed by pressuring the composite carbon particle using a binder.

18. The composite carbon particle according to claim 1, wherein the petroleum coke has a Hardgrove grindability index of 35 to 55.

19. The method according to claim 4, wherein the petroleum coke has a Hardgrove grindability index of 35 to 55.

20. The lithium-ion secondary battery according to claim 12, wherein the petroleum coke has a Hardgrove grindability index of 35 to 55.

* * * * *